(12) United States Patent
Usui et al.

(10) Patent No.: US 12,314,555 B2
(45) Date of Patent: May 27, 2025

(54) DISPLAY APPARATUS

(71) Applicant: SEIKO EPSON CORPORATION, Tokyo (JP)

(72) Inventors: Daigo Usui, Shiojiri (JP); Masato Tsukioka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/168,592

(22) Filed: Feb. 14, 2023

(65) Prior Publication Data

US 2023/0259266 A1 Aug. 17, 2023

(30) Foreign Application Priority Data

Feb. 14, 2022 (JP) ................................ 2022-020230

(51) Int. Cl.
*G06F 3/048* (2013.01)
*G06F 3/0482* (2013.01)
*G06F 3/0485* (2022.01)

(52) U.S. Cl.
CPC .......... *G06F 3/0485* (2013.01); *G06F 3/0482* (2013.01); *G06F 2203/04804* (2013.01)

(58) Field of Classification Search
None
See application file for complete search history.

(56) References Cited

U.S. PATENT DOCUMENTS

| 6,590,595 B1* | 7/2003 | Wagner | G06F 3/04855 715/784 |
|---|---|---|---|
| 2008/0284756 A1* | 11/2008 | Hsu | G06F 3/0488 345/178 |
| 2011/0055753 A1* | 3/2011 | Horodezky | G06F 3/04883 715/810 |
| 2011/0188076 A1 | 8/2011 | Maeda | |
| 2011/0258577 A1* | 10/2011 | Steelberg | G06F 3/04855 715/786 |
| 2014/0201677 A1* | 7/2014 | Jin | G06F 3/04855 715/786 |

(Continued)

FOREIGN PATENT DOCUMENTS

JP 2011160027 A 8/2011

*Primary Examiner* — Thanh T Vu
(74) *Attorney, Agent, or Firm* — CHIP LAW GROUP (57) ABSTRACT

A multifunction peripheral includes a display unit configured to display a destination designation screen including a destination candidate display section for displaying a predetermined number of destination candidates among the plurality of destination candidates to be capable of being scrolled in the up-down direction and a scroll bar indicating a scroll state of the destination candidate display section, an operation unit configured to receive operation for pointing a position in the destination designation screen, and a control unit configured to specify, based on the operation, a destination out of the plurality of destination candidates. Scroll operation regions for scrolling the destination candidates are set in the destination designation screen. The scroll operation regions are divided into a plurality of subregions. When the operation unit receives the operation on any one of the subregions, the destination candidates displayed in the destination candidate display section change according to the operated subregion.

9 Claims, 7 Drawing Sheets

(56) References Cited

U.S. PATENT DOCUMENTS

2016/0117092 A1* 4/2016 Wang ................... G06F 3/0482
715/786
2019/0026017 A1* 1/2019 Lee ................... G06F 3/04855
2020/0310557 A1* 10/2020 Parkos ................... G06F 3/038
2022/0197494 A1* 6/2022 Li ......................... G06F 3/0485

* cited by examiner

DISPLAY APPARATUS

The present application is based on, and claims priority from JP Application Serial Number 2022-020230, filed Feb. 14, 2022, the disclosure of which is hereby incorporated by reference herein in its entirety.

BACKGROUND

1. Technical Field

The present disclosure relates to a display apparatus.

2. Related Art

There has been known a communication apparatus capable of transmitting and receiving data of an electronic mail, a facsimile, and the like, when transmitting the data, the communication apparatus displaying, on a display unit, a registered plurality of destinations and causing a user to select a desired destination out of the plurality of destinations.

In a communication apparatus described in JP-A-2011-160027 (Patent Literature 1), a button for scrolling destination candidates is displayed on a screen of a display unit together with a predetermined number of destination candidates. By operating the button, a user can cause the display unit to display, in the screen, a desired destination candidate out of a plurality of destination candidates and can select the desired destination candidate as a destination.

However, in the configuration explained above, the destination candidates are scrolled by a predetermined amount every time the button is operated once. When a large number of destination candidates are registered, the button needs to be operated many times to find out a desired destination candidate.

SUMMARY

A display apparatus includes: a storage unit configured to store destination book data including a plurality of destination candidates; a display unit configured to display a display image including a destination candidate display section for displaying a predetermined number of destination candidates among the plurality of destination candidates to be capable of being scrolled in a first direction and a scroll bar indicating a scroll state of the destination candidate display section; an operation unit configured to receive operation for pointing a position in the display image; and a control unit configured to specify, based on the operation, a destination out of the plurality of destination candidates. At least one scroll operation region for scrolling the destination candidates is set in the display image. The one scroll operation region is divided into a plurality of subregions. When the operation unit receives the operation on any one of the subregions, the destination candidates displayed in the destination candidate display section change according to the operated subregion.

DESCRIPTION OF EXEMPLARY EMBODIMENTS

Figure 1:
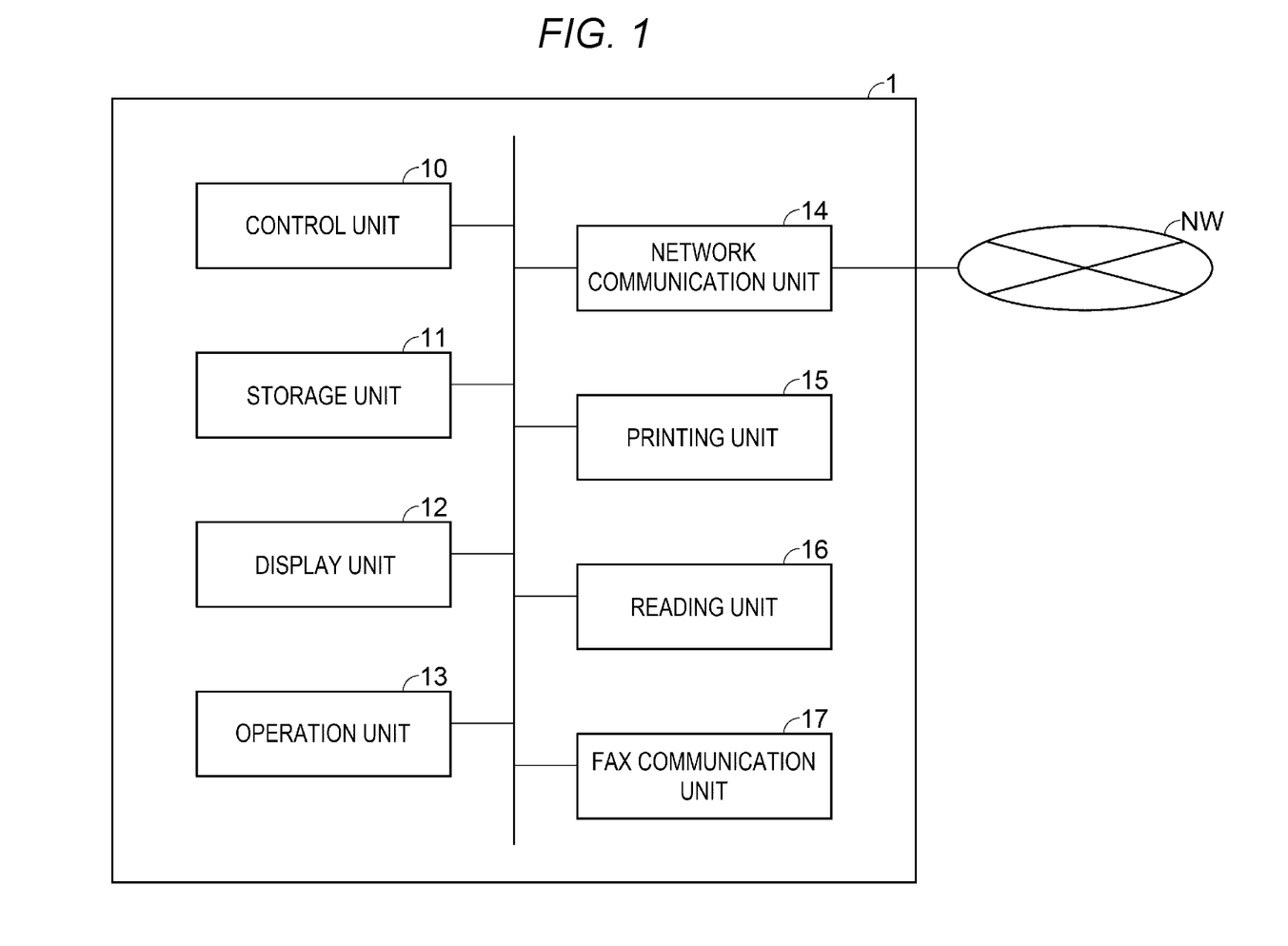
FIG. 1 is a block diagram showing a configuration of a multifunction peripheral.

FIG. 1 is a block diagram showing a configuration of a multifunction peripheral 1 functioning as a display apparatus in an embodiment.

As shown in FIG. 1, the multifunction peripheral 1 includes a control unit 10, a storage unit 11, a display unit 12, an operation unit 13, a network communication unit 14, a printing unit 15, a reading unit 16, and a facsimile communication unit 17.

The control unit 10 includes a processor such as a CPU (Central Processing Unit), a ROM (Read Only Memory), and a RAM (Random Access Memory) not shown in FIG. 1. The control unit 10 executes various programs recorded in the storage unit 11 to thereby control the units of the multifunction peripheral 1. The control unit 10 may be configured by a single chip or may be configured by a plurality of chips. As the processor, for example, an ASIC (Application Specific IC) may be adopted instead of the CPU. The CPU and the ASIC may be configured to cooperate.

The storage unit 11 is configured by a nonvolatile memory or the like and stores the programs explained above, various data, and the like. Not-shown destination book data in which a plurality of mail addresses and the like are registered is stored in the storage unit 11 in this embodiment.

The display unit 12 is configured by a display apparatus such as a liquid crystal display or an organic EL (Electro-Luminescence) display and displays various display images based on the control of the control unit 10.

The operation unit 13 is a device capable of detecting operation performed by a finger or the like of a user. In this embodiment, the operation unit 13 is configured by a touch sensor disposed over the display unit 12. That is, the display unit 12 and the operation unit 13 function as a touch panel display. The operation unit 13 receives operation of the user for pointing a position in a display image displayed by the display unit 12. The control unit 10 executes various kinds of processing according to, for example, positions pointed by the operation. The operation unit 13 is capable of detecting, as the operation for pointing a position in the display image, for example, "touch" for touching the display image with a finger, "tap" for touching the display image and, thereafter, releasing the finger, and "drag" for moving the finger in a predetermined direction in a state in which the finger is touching the display image. The operation unit 13 is not limited to the touch sensor disposed over the display unit 12 and may be, for example, an operation button disposed around the display unit 12. In this case, the user operates the operation button to thereby move a pointer displayed on the display unit 12.

The network communication unit 14 includes various circuits for performing communication with an external apparatus via a network NW such as a LAN (Local Area Network). A form of the communication may be wired communication or may be wireless communication.

The printing unit 15 executes printing on a printing medium such as paper. The printing unit 15 includes various driving circuits and driving mechanisms besides printing heads adapted to various printing schemes such as an inkjet scheme and an electrophotographic scheme.

The reading unit 16 reads a document placed on a not-shown document table glass or a document set on a document tray of a not-shown ADF (Auto Document Feeder) and generates image data. The reading unit 16 includes, for example, various driving circuits and driving mechanisms for conveying the document besides a well-known color image sensor and a light source.

The facsimile communication unit 17 includes a modem and a peripheral circuit of the modem and receives a facsimile from the outside and transmits, by facsimile, the image data of the document read by the reading unit 16 through a public switched telephone network or the like.

In this embodiment, the multifunction peripheral 1 is installed in an office or the like. The user can use various functions realized by the configuration explained above using the multifunction peripheral 1. The multifunction peripheral 1 in this embodiment includes a plurality of functions such as a printing function realized by the printing unit 15, a scanning function realized by the reading unit 16, a copying function realized by the printing unit 15 and the reading unit 16, and a facsimile function realized by the reading unit 16 and the facsimile communication unit 17.

When the multifunction peripheral 1 is turned on, the control unit 10 executes a not-shown control program stored in the storage unit 11 and starts control of the multifunction peripheral 1. First, after executing various initial operations, the control unit 10 causes the display unit 12 to display a home screen P1 as a display image.

Figure 2:
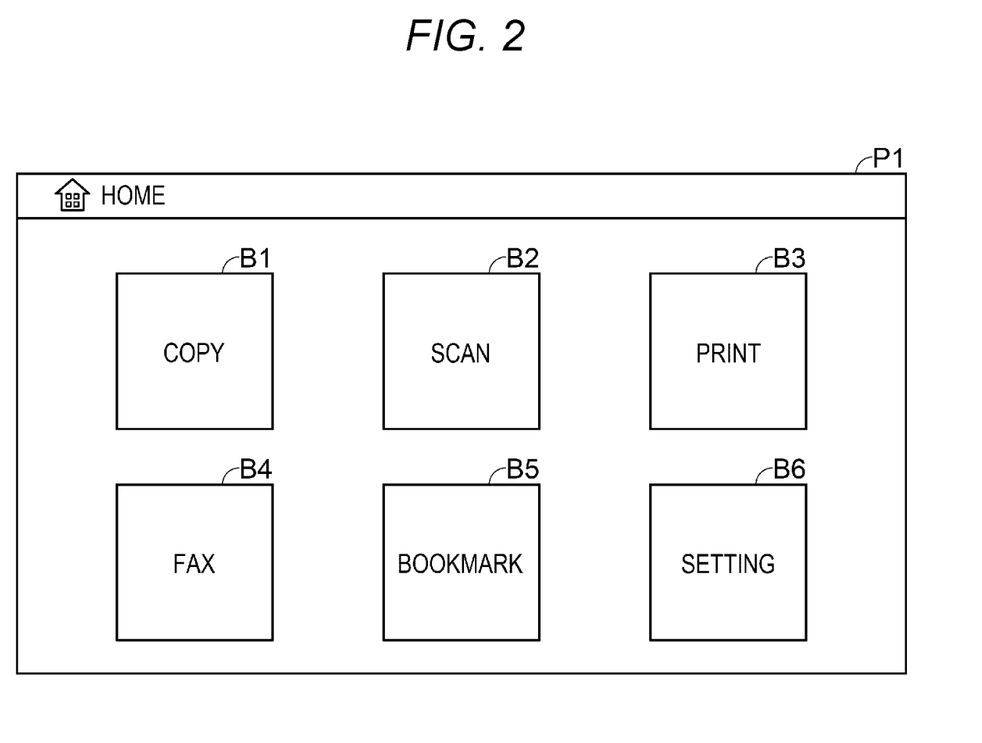
FIG. 2 is a diagram showing an example of a home screen.

FIG. 2 is a diagram showing an example of the home screen P1. The home screen P1 includes a plurality of function selection buttons B1 to B6 corresponding to the various functions and the like explained above. By tapping any one of the function selection buttons B1 to B6, the user can use a function associated with the tapped function selection button.

For example, when the function selection button B1 associated with the copying function is tapped by the user, the control unit 10 causes the reading unit 16 to execute document reading and, thereafter, causes the printing unit 15 to print an image based on image data generated by the reading.

For example, when the function selection button B2 corresponding to the scanning function is operated by the user, the control unit 10 can cause the reading unit 16 to execute document reading and cause the storage unit 11 to store generated image data or transmit the image data to the outside as an electronic mail via the network communication unit 14 according to an instruction of the user. When the transmission of the electronic mail is instructed by the user, the control unit 10 causes the display unit 12 to display, as a display image, a destination designation screen P2 for designating a destination of the electronic mail.

Figure 3:
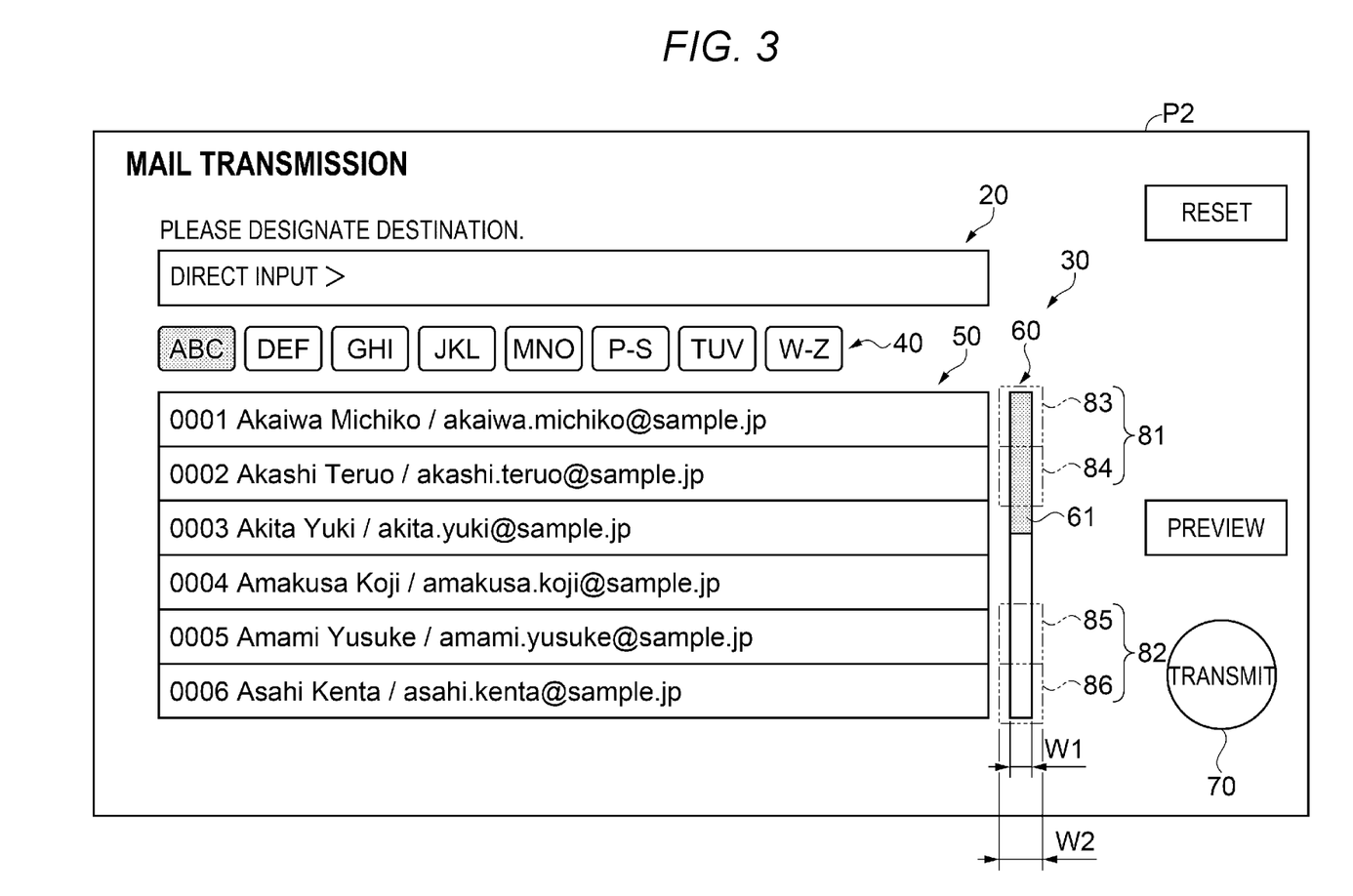
FIG. 3 is a diagram showing an example of a destination designation screen.

FIG. 3 is a diagram showing an example of the destination designation screen P2. Image data representing the destination designation screen P2 is generated by the control unit 10. The display unit 12 displays the destination designation screen P2 based on the image data output from the control unit 10. The destination designation screen P2 includes a destination input section 20, a destination selection section 30, and a transmission button 70.

A destination is input to the destination input section 20 by the user. When the user taps the destination input section 20, the control unit 10 causes the display unit 12 to display a not-shown keyboard screen over the destination designation screen P2. The user can input a mail address to the destination input section 20 by tapping a key button included in the keyboard screen.

The destination selection section 30 is arranged on the lower side of the destination input section 20. A plurality of destination candidates are displayed in the destination selection section 30 based on the destination book data stored in the storage unit 11. The user can easily designate a destination by tapping a destination candidate displayed in the destination selection section 30 instead of inputting a mail address to the destination input section 20.

The destination book data includes a plurality of destination data corresponding to the plurality of destination candidates. In the destination data in this embodiment, various kinds of information including registration names described in alphabets and mail addresses are registered. The destination candidates are sorted in predetermined order. A part of the destination candidates is displayed in the destination selection section 30. In this embodiment, the destination candidates are sorted in ascending order according to the alphabets of the registration names. Specifically, the control unit 10 reads out the destination book data from the storage unit 11, rearranges, in the order described above, the destination data included in the destination book data, and, thereafter, stores the destination data in the storage unit 11 as temporary data. Thereafter, the control unit 10 displays the destination candidates in the destination selection section 30 based on the temporary data.

The plurality of destination candidates included in the destination book data and the temporary data can be classified into a plurality of "groups" according to capital letters of the registration names. Since the plurality of destination candidates included in the temporary data are sorted according to the registration names, the destination candidates of the same group are continuously arrayed. The plurality of destination candidates can also be classified into a "cluster" obtained by combining some of the groups. For example, a cluster of "ABC" can be formed by combining a group having a capital letter A, a group having a capital letter B, and a group having a capital letter C.

The destination selection section 30 includes a cluster selection section 40, a destination candidate display section 50, and a scroll bar 60.

The cluster selection section 40 includes a plurality of cluster selection buttons for selecting a "cluster" to which the destination candidates belong. In this embodiment, the destination candidates are classified into eight clusters based on the capital letters of the registration names. Specifically, the destination candidates are classified into a cluster of "DEF", a cluster of "GHI", a cluster of "JKL", a cluster of "MNO", a cluster of "P to S", a cluster of "TUV", and a cluster of "W to Z" besides the cluster of "ABC" having the capital letter A, B, or C. In the cluster selection section 40, eight cluster selection buttons for selecting the clusters are disposed. The user can select a desired cluster by tapping any one of the cluster selection buttons of the cluster selection section 40. In the following explanation, a cluster selected in the cluster selection section 40 is referred to as "selected cluster" as well.

In the destination candidate display section 50, a list of destination candidates belonging to the selected cluster selected in the cluster selection section 40 is displayed. Specifically, registration names and mail addresses of the destination candidates are displayed. The destination candidate display section 50 is capable of displaying a predetermined number of destination candidates side by side in the up-down direction. Six destination candidates are displayed in the destination candidate display section 50 shown in FIG. 3. When the destination candidates belonging to the selected cluster selected in the cluster selection section 40 is more than the predetermined number, the control unit 10 changes, according to scroll operation, the destination candidates that the control unit 10 causes the display unit 12 to display in the destination candidate display section 50. Consequently, by scrolling the destination candidates, the user can cause the display unit 12 to display not-displayed destination candidates, that is, change the destination candidates displayed in the destination candidate display section 50. For example, by performing dragging operation in the up-down direction in the destination candidate display section 50, the user can scroll the destination candidates in the up-down direction in units of one destination candidate. The up-down direction is equivalent to the first direction.

In the destination designation screen P2, two scroll operation regions 81 and 82 for scrolling destination candidates in units of a plurality of destination candidates are set in a position adjacent to the right side of the destination candidate display section 50. In FIG. 3, the scroll operation regions 81 and 82 are indicated by alternate long and two short dashes lines. However, actually, the scroll operation regions 81 and 82 are invisible. The two scroll operation regions 81 and 82 are arranged to be separated in the up-down direction. The upper scroll operation region 81 is a region for scrolling the destination candidates in the upward direction. The lower scroll operation region 82 is a region for scrolling the destination candidates in the downward direction. When the scroll operation region 81 or 82 is tapped by the user and the operation unit 13 receives this operation, the control unit 10 scrolls the destination candidates displayed in the destination candidate display section 50.

Each of the scroll operation regions 81 and 82 is further divided into two subregions arranged side by side in the up-down direction. Specifically, the upper scroll operation region 81 is divided into a subregion 83 on the upper side and a subregion 84 on the lower side. The lower scroll operation region 82 is divided into a subregion 85 on the upper side and a subregion 86 on the lower side. Among these four subregions 83 to 86 arranged side by side in the up-down direction, a scroll amount of the subregions 83 and 86 located on the outer side is set larger compared with a scroll amount of the subregions 84 and 85 located on the inner side. That is, a scroll amount is larger as a tapped subregion is a subregion farther from the center in the up-down direction of the scroll bar 60.

For example, the scroll amount of the subregions 84 and 85 located on the inner side is set to "5" and the scroll amount of the subregions 83 and 86 located on the outer side is set to "10". At this time, when the subregion 84 on the lower side in the upper scroll operation region 81 is tapped, the control unit 10 updates display content of the destination candidate display section 50 such that a predetermined number of destination candidates from a fifth destination candidate preceding a destination candidate displayed at the top at this point in time are displayed in the destination candidate display section 50. When the subregion 85 on the upper side in the lower scroll operation region 82 is tapped, the control unit 10 updates the display content of the destination candidate display section 50 such that a predetermined number of destination candidates from a fifth destination candidate following a destination candidate displayed at the top at this point in time are displayed in the destination candidate display section 50. Similarly, when the subregion 83 on the upper side in the upper scroll operation region 81 is tapped, the control unit 10 causes the display unit 12 to display, in the destination candidate display section 50, a predetermined number of destination candidates from a tenth preceding destination candidate. When the subregion 86 on the lower side in the lower scroll operation region 82 is tapped, the control unit 10 causes the display unit 12 to display, in the destination candidate display section 50, a predetermined number of destination candidates from a tenth following destination candidate. In this way, the destination candidates displayed in the destination candidate display section 50 change according to a tapped subregion.

When destination candidates corresponding in number to a designated scroll amount are absent before and after the destination candidates displayed at this point in time, the control unit 10 scrolls destination candidates as many as possible. When the upper scroll operation region 81 is tapped in a state in which a destination candidate at the top of the selected cluster is displayed in the destination candidate display section 50 and when the lower scroll operation region 82 is tapped in a state in which a destination candidate at the end of the selected cluster is displayed in the destination candidate display section 50, these kinds of operation are neglected.

In the position adjacent to the right side of the destination candidate display section 50, the scroll bar 60 indicating a scroll state of the destination candidate display section 50 is arranged to overlap the scroll operation regions 81 and 82. The scroll bar 60 is an image extending in a belt shape in the up-down direction. The length in the up-down direction of the scroll bar 60 is substantially equal to the height in the up-down direction of the destination candidate display section 50. Width W1 in the left-right direction of the scroll bar 60 is smaller than width W2 in the left-right direction of the scroll operation regions 81 and 82. In other words, the scroll operation regions 81 and 82 are wider in the left-right direction than the scroll bar 60. The left-right direction is a direction crossing the up-down direction and is equivalent to the second direction.

The scroll bar 60 includes a knob 61 movable in the up-down direction. When the user taps the scroll operation region 81 or 82 and scrolls the destination candidates, the knob 61 moves in the up-down direction according to a scroll amount. The length in the up-down direction of the knob 61 is variable. The knob 61 is shorter as the number of destination candidates belonging to a selected cluster selected in the cluster selection section 40 is larger. Specifically, when the number of destination candidates displayed in the destination candidate display section 50 is represented as "display number", the length of the knob 61 with respect to the length of the entire scroll bar 60 corresponds to a display number with respect to the number of destination candidates belonging to the selected cluster. In this way, the knob 61 indicates a range, in the destination candidates belonging to the selected cluster, of the destination candidates displayed in the destination candidate display section 50 and is equivalent to the range display section.

After causing the display unit 12 to display a desired destination in the destination candidate display section 50 by performing operation on the cluster selection section 40, operation on the scroll operation regions 81 and 82, and drag operation on the destination candidate display section 50, the user can designate the destination by tapping the destination. After designating a destination by inputting the destination to the destination input section 20 or selecting the destination in the destination candidate display section 50, when the user performs operation for tapping the transmission button 70, the control unit 10 transmits image data of a document read by the reading unit 16 to a mail address of the designated destination.

Figure 4:
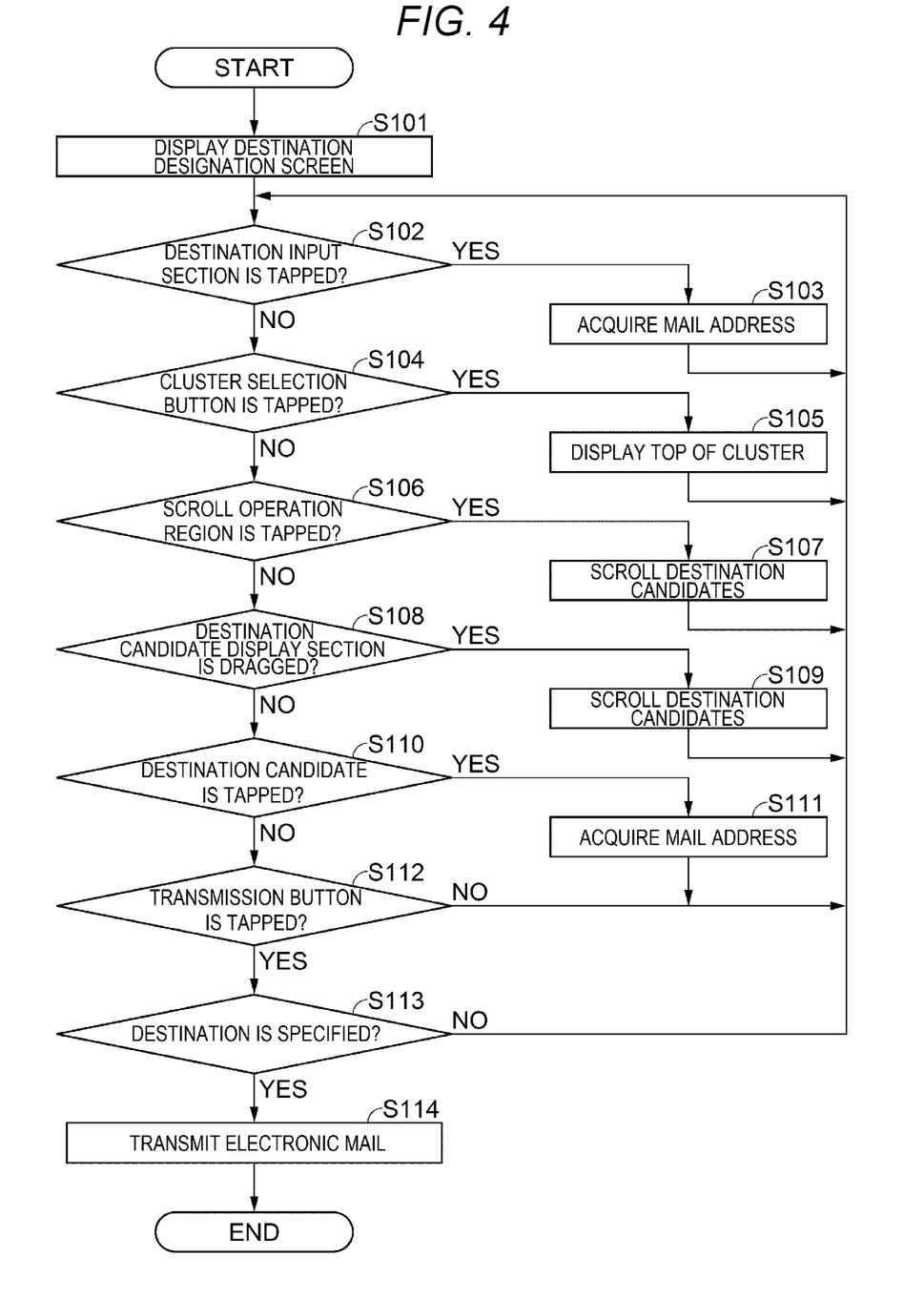
FIG. 4 is a flowchart for explaining an operation of the multifunction peripheral during display of the destination designation screen.

FIG. 4 is a flowchart for explaining an operation of the multifunction peripheral 1 that is displaying the destination designation screen P2. After the function selection button B2 corresponding to the scanning function is tapped by the user on the home screen P1 and the reading unit 16 executes document reading, when transmission by electronic mail is instructed by the user, the control unit 10 operates according to a flow shown in FIG. 4.

As shown in FIG. 4, in step S101, the control unit 10 causes the display unit 12 to display the destination designation screen P2.

In step S102, the control unit 10 determines whether the destination input section 20 is tapped by the user. When the destination input section 20 is tapped, the control unit 10 shifts the processing to step S103. When the destination input section 20 is not tapped, the control unit 10 shifts the processing to step S104.

When the destination input section 20 is tapped and the processing is shifted to step S103, the control unit 10 displays a keyboard screen over the destination designation screen P2. When the user inputs a mail address using the keyboard screen, the control unit 10 acquires the input mail address and specifies the mail address as a destination. Thereafter, the control unit 10 returns the processing to step S102.

When the processing is shifted to step S104, the control unit 10 determines whether any cluster selection button of the cluster selection section 40 is tapped. When any cluster selection button is tapped, the control unit 10 shifts the processing to step S105. When no cluster selection button is tapped, the control unit 10 shifts the processing to step S106.

When any cluster selection button is tapped and the processing is shifted to step S105, the control unit 10 reversely displays the tapped cluster selection button and updates the display content of the destination candidate display section 50 such that a predetermined number of destination candidates from a destination candidate at the top in a cluster corresponding to the cluster selection button are displayed in the destination candidate display section 50. Thereafter, the control unit 10 returns the processing to step S102.

When the processing is shifted to step S106, the control unit 10 determines whether the scroll operation region 81 or 82 are tapped. When the scroll operation region 81 or 82 is tapped, the control unit 10 shifts the processing to step S107. When the scroll operation region 81 or 82 is not tapped, the control unit 10 shifts the processing to step S108.

When the scroll operation region 81 or 82 is tapped and the processing is shifted to step S107, the control unit 10 scrolls, according to the tapped one of the subregions 83 to 86, in units of a plurality of destination candidates, the destination candidates displayed in the destination candidate display section 50 and moves the position of the knob 61. Thereafter, the control unit 10 returns the processing to step S102.

When the processing is shifted to step S108, the control unit 10 determines whether the destination candidate display section 50 is dragged. When the destination candidate display section 50 is dragged, the control unit 10 shifts the processing to step S109. When the destination candidate display section 50 is not dragged, the control unit 10 shifts the processing to step S110.

When the destination candidate display section 50 is dragged and the processing is shifted to step S109, the control unit 10 scrolls, according to a distance and a direction of the dragging, in units of one destination candidate, the destination candidates displayed in the destination candidate display section 50 and moves the position of the knob 61. Thereafter, the control unit 10 returns the processing to step S102.

When the processing is shifted to step S110, the control unit 10 determines whether any one of the destination candidates displayed in the destination candidate display section 50 is tapped. When any one of the destination candidates is tapped, the control unit 10 shifts the processing to step S111. When none of the destination candidates is tapped, the control unit 10 shifts the processing to step S112.

When any one of the destination candidates is tapped and the processing is shifted to step S111, the control unit 10 specifies the tapped destination candidate as a destination and acquires a mail address from destination data corresponding to the destination. Thereafter, the control unit 10 returns the processing to step S102.

When the processing is shifted to step S112, the control unit 10 determines whether the transmission button 70 is tapped. When the transmission button 70 is tapped, the control unit 10 shifts the processing to step S113. When the transmission button 70 is not tapped, the control unit 10 shifts the processing to step S102.

When the transmission button 70 is tapped and the processing is shifted to step S113, the control unit 10 determines whether a destination is specified, that is, whether a mail address is acquired in step S103 or step S111. When a destination is specified, the control unit 10 shifts the processing to step S114. When a destination is not specified, the control unit 10 shifts the processing to step S102.

When a destination is specified and the processing is shifted to step S114, the control unit 10 creates an electronic mail addressed to the acquired mail address, transmits the electronic mail attached with the image data of the document read by the reading unit 16, and ends the flow.

As explained above, according to this embodiment, it is possible to obtain the following effects.

(1) According to this embodiment, the scroll operation regions 81 and 82 set in the destination designation screen P2 are divided into the plurality of subregions 83 to 86. The destination candidates displayed in the destination candidate display section 50 change according to the tapped one of the subregions 83 to 86. Therefore, it is possible to easily find out a desired destination.

(2) According to this embodiment, the scroll operation regions 81 and 82 are set in the position overlapping the scroll bar 60. Therefore, it is possible to perform intuitive operation for operating the scroll bar 60.

(3) According to this embodiment, the scroll operation regions 81 and 82 are wider in the left-right direction than the scroll bar 60. Therefore, operability at a scrolling time is improved.

(4) According to this embodiment, the scroll operation regions 81 and 82 are arranged to be separated in the up-down direction. Therefore, it is possible to prevent wrong operation of the user.

The embodiment may be changed as explained below.

Figure 5:
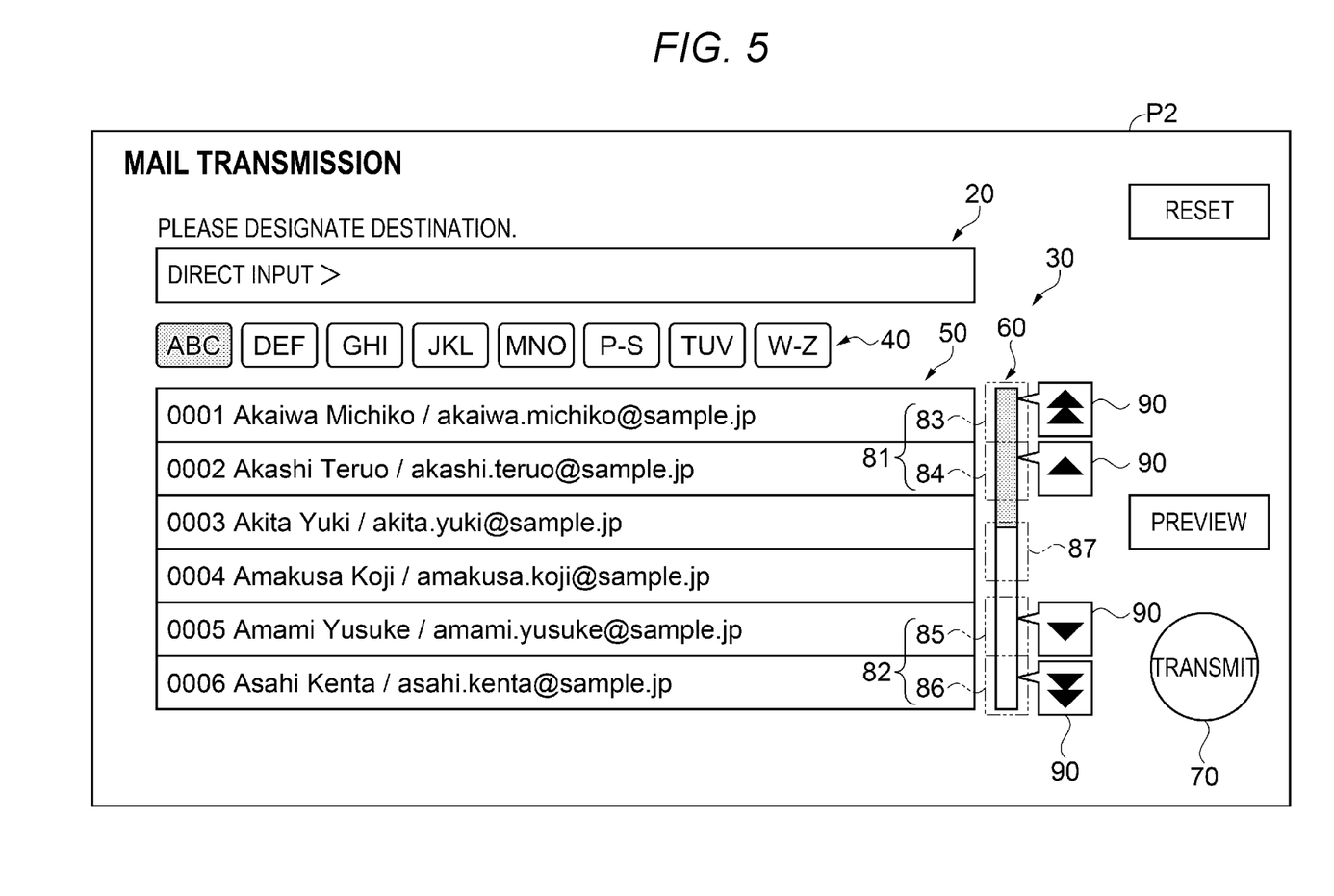
FIG. 5 is a diagram showing an example of a destination designation screen according to a modification.

In this embodiment, the scroll operation regions 81 and 82 are the invisible regions. However, the scroll operation regions 81 and 82 may be visible regions. As shown in FIG. 5, identification labels 90 for identifying scroll directions and scroll amounts set in the subregions 83 to 86 may be added to the subregions 83 to 86 and displayed. At this time, a state in which the identification labels 90 are displayed and a state in which the identification labels 90 are not displayed may be capable of being switched by tapping a predetermined region in the destination designation screen P2. For example, an intermediate region 87 located between the upper scroll operation region 81 and the lower scroll operation region 82 can be set as the predetermined region. The identification labels 90 may be displayed at a stage when a finger touches the scroll operation region 81 or 82. In this case, after touching the scroll operation region 81 or 82 with the finger and displaying the identification labels 90, when the user slides the finger while keeping on touching the scroll operation region 81 or 82 and releases the finger on a desired subregion, scroll corresponding to the subregion is performed.

Figure 6:
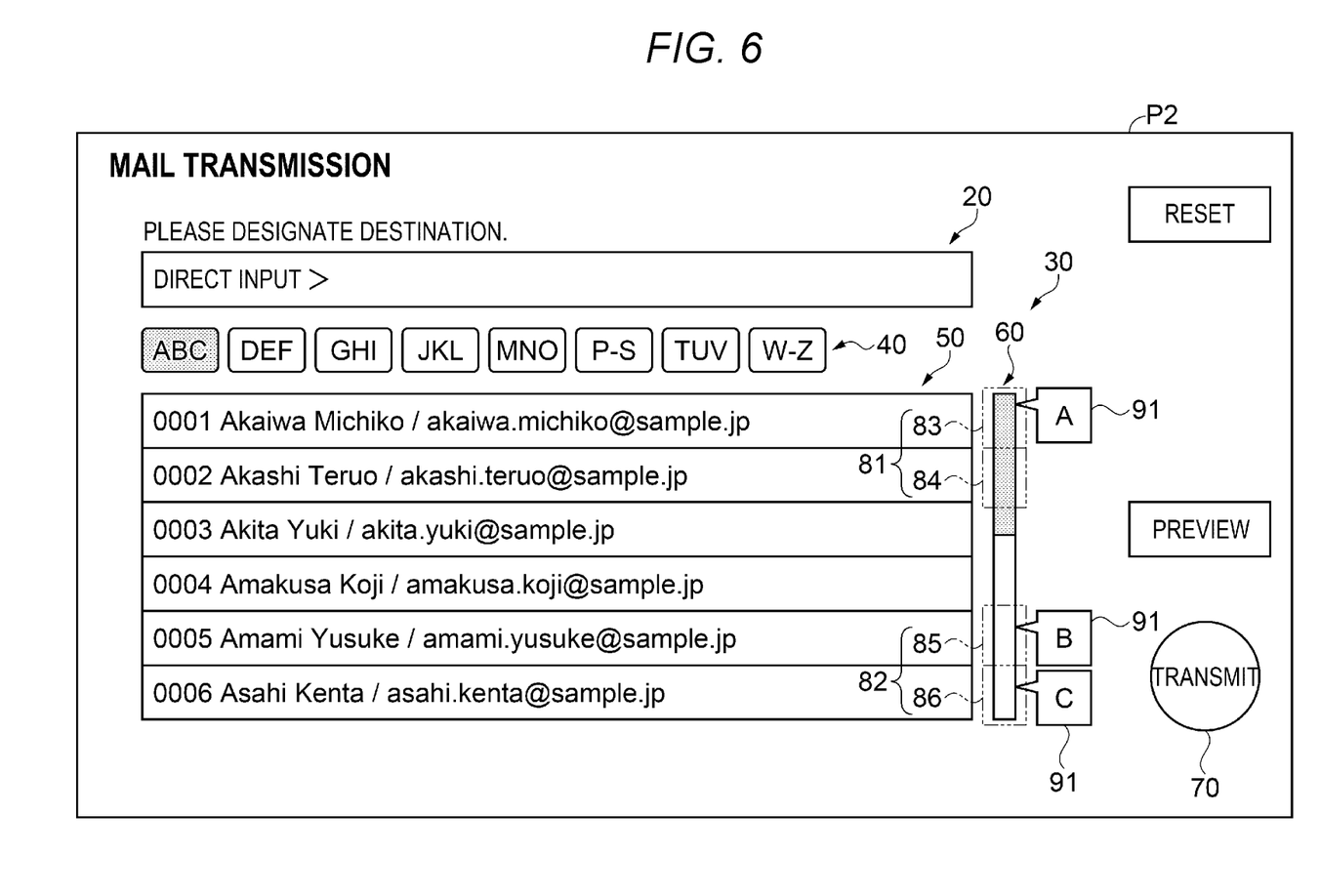
FIG. 6 is a diagram showing an example of a destination designation screen according to a modification.

As shown in FIG. 6, in this embodiment explained above, groups classified by capital letters of registration names may be associated with the subregions 83 to 86 of the scroll operation regions 81 and 82 and identification labels 91 for identifying the associated groups may be added to the subregions 83 to 86 and displayed. In an example shown in FIG. 6, a group having a capital letter A is associated with the subregions 83 and 84 of the upper scroll operation region 81, a group having a capital letter B is associated with the subregion 85 of the lower scroll operation region 82, and a group having a capital letter C is associated with the subregion 86 of the lower scroll operation region 82. By tapping any one of the subregions 83 to 86, the user can cause the display unit 12 to display, in the destination candidate display section 50, destination candidates belonging to a group corresponding to the tapped one of the subregions 83 to 86. That is, when any one of the subregions 83 to 86 is tapped by the user and the operation unit 13 receives this operation, the control unit 10 updates the display content of the destination candidate display section 50 such that a predetermined number of destination candidates from a destination candidate at the top in a group corresponding to the tapped one of the subregions 83 to 86. With such a configuration, by referring to the identification labels 91, it is easier for the user to find out destination candidates belonging to a desired group.

The association of the subregions 83 to 86 and the groups may change according display content of the destination candidate display section 50. For example, as shown in FIG. 6, in a state in which the group having the capital letter A is displayed in the destination candidate display section 50, the groups having the capital letters B and C located further backward than the group having the capital letter A are associated with the subregions 85 and 86 of the lower scroll operation region 82. On the other hand, in a state in which the group having the capital letter C is displayed in the destination candidate display section 50, the groups having the capital letters A and B located further forward than the group having the capital letter C are preferably associated with the subregions 83 and 84 of the upper scroll operation region 81.

Like the identification labels 90, a state in which the identification labels 91 are displayed and a state in which the identification labels 91 are not displayed may be capable of being switched by tapping a predetermined region in the destination designation screen P2. That is, when the predetermined region is tapped by the user and the operation unit 13 receives this operation in the state in which the identification labels 91 are not displayed, the display unit 12 may display the identification labels 91. Like the identification labels 90, the identification labels 91 may be displayed at a stage when a finger touches the scroll operation region 81 or 82. That is, when any one of the subregions 83 to 86 is touched by the user and the operation unit 13 receives this operation in the state in which the identification labels 91 are not displayed, the display unit 12 may display the identification labels 91.

Figure 7:
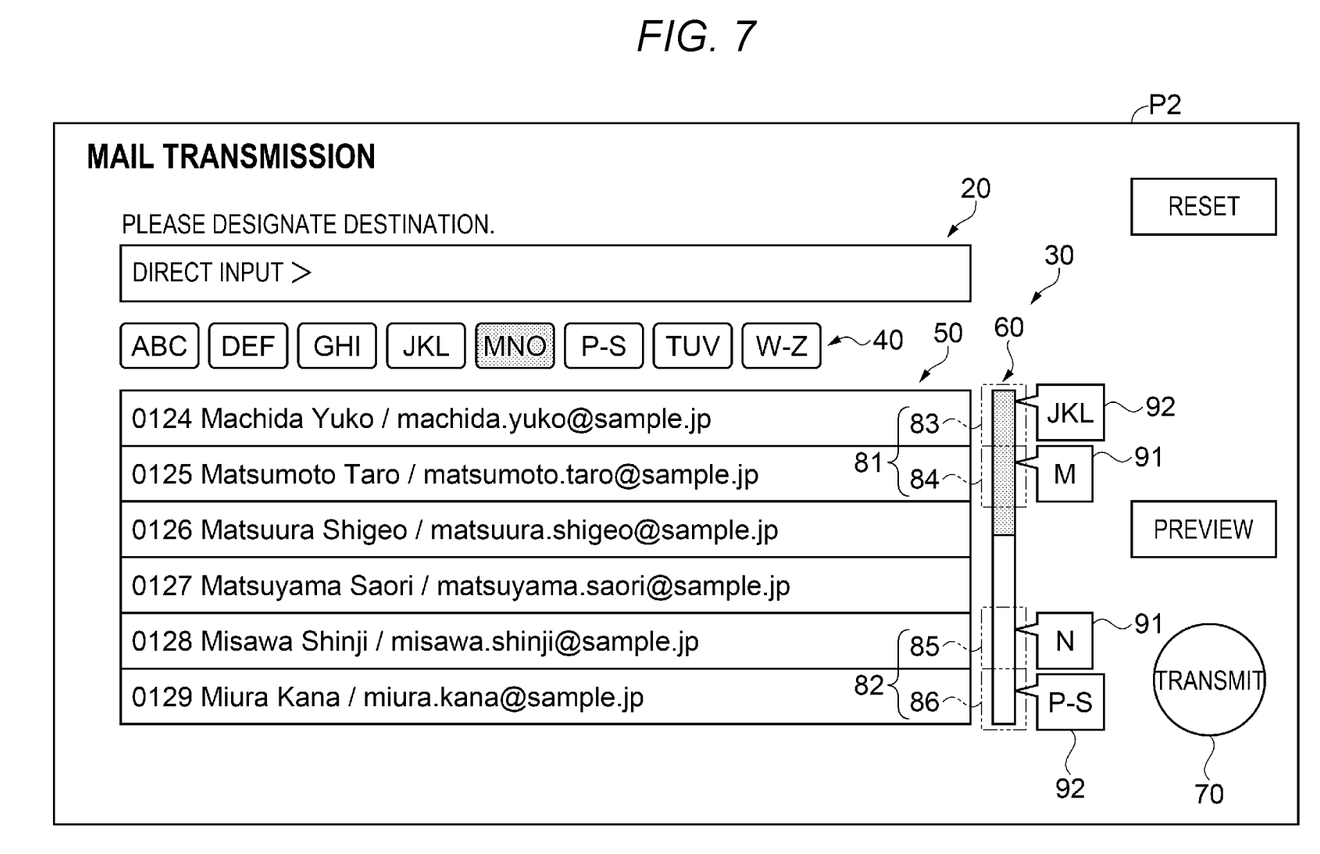
FIG. 7 is a diagram showing an example of a destination designation screen according to a modification.

As shown in FIG. 7, a cluster different from the selected cluster may be associated with a part of the subregions 83 to 86 of the scroll operation regions 81 and 82. In an example shown in FIG. 7, a state is shown in which a cluster of "MNO" having a capital letter M, N, or O is selected and destination candidates of a group having the capital letter M are displayed in the destination candidate display section 50. In this state, a cluster of "JKL" located further forward than the selected cluster is associated with the subregion 83 on the upper side of the upper scroll operation region 81 and a cluster of "P to S" located further backward than the selected cluster is associated with the subregion 86 on the lower side of the lower scroll operation region 82. Identification labels 92 for identifying the associated clusters are arranged near the subregions 83 and 86. When the subregion 83 or 86 is tapped by the user, the control unit 10 updates the display content of the destination candidate display section 50 such that a predetermined number of destination candidates from a destination candidate at the top in the cluster corresponding to the tapped subregion 83 or 86 are displayed in the destination candidate display section 50.

In the embodiment explained above, each of the scroll operation regions 81 and 82 are divided into the two subregions. However, each of the scroll operation regions 81 and 82 may be divided into three or more subregions. The number of subregions may be different in each of the scroll operation regions 81 and 82. One of the scroll operation regions 81 and 82 may not be divided into a plurality of subregions. That is, at least one scroll operation region only has to be divided into a plurality of subregions. The sizes of all the subregions may be the same or may be different.

In the embodiment explained above, a case is explained in which the registration names are registered in the alphabets. However, the registration names may be registered in characters other than the alphabets. For example, in the multifunction peripheral 1 adapted to Japanese, when registration names represented by Chinese characters or the like, readings of the registration names represented by Hiragana characters or the like, and mail addresses are registered in destination data of destination candidates, a plurality of destination candidates can be classified into groups and clusters according to the readings of the registration names. For example, the plurality of destination candidates can be classified into a plurality of groups according to first Hiragana characters of the readings of the registration names and classified into a plurality of clusters according to the rows in the Japanese syllabary table. In this case, cluster selection buttons corresponding to the rows of the Japanese syllabary table such as "a", "ka", and "sa" are arranged in the cluster selection section 40 of the destination selection section 30.

In the embodiment explained above, the groups for classifying the destination candidates are not limited to the groups based on the letters such as the alphabets. The groups may be groups classified based on a variety of standards such as various numbers, relationships, belonging departments, and regions.

In the embodiment explained above, the multifunction peripheral 1 is explained as an example of the display apparatus. However, the display apparatus is not limited to the multifunction peripheral 1 and only has to be an apparatus that causes a display unit to display a plurality of destination candidates in order to determine a destination.

The destination is not limited to the mail address and may be a telephone number, a facsimile number, an address, or the like.

What is claimed is:

1. A display apparatus, comprising:
   a storage unit configured to store destination book data including a plurality of destination candidates;
   a display unit configured to display a display image that includes:
   a destination candidate display section that displays a predetermined number of destination candidates among the plurality of destination candidates to be capable of being scrolled in a first direction, and
   a scroll bar that indicates a scroll state of the destination candidate display section;
   an operation unit configured to receive an operation that points a position in the display image; and
   a control unit configured to specify, based on the operation, a destination candidate of the plurality of destination candidates, wherein
   at least one scroll operation region for scrolling the plurality of destination candidates is set in the display image,
   the at least one scroll operation region is divided into a plurality of subregions each overlapping the scroll bar,
   in a case where the operation unit receives the operation on one subregion of the plurality of subregions, the predetermined number of destination candidates displayed in the destination candidate display section change according to the operated one subregion,
   each subregion of the plurality of subregions is associated with a scroll amount which corresponds to a number of destination candidates that is scrolled in the destination candidate display section for each operation on a respective subregion of the plurality of subregions,
   the scroll amount for the operation on a first subregion of the plurality of subregions corresponding to a first position on the scroll bar is different from the scroll amount for the operation on a second subregion of the plurality of subregions corresponding to a second position on the scroll bar,
   the display unit adds a plurality of first identification labels at positions corresponding to the plurality of subregions, each first identification label of the plurality of first identification labels identifies the scroll amount of the respective subregion of the plurality of subregions, and
   a state in which the plurality of first identification labels is displayed and a state in which the plurality of first identification labels is not displayed is switchable by a user operation on a specific region in the display image different from the plurality of subregions.

2. The display apparatus according to claim 1, wherein the at least one scroll operation region is invisible.

3. The display apparatus according to claim 1, wherein the at least one scroll operation region is set in a position overlapping the scroll bar.

4. The display apparatus according to claim 3, wherein the at least one scroll operation region is wider in a second direction crossing the first direction than the scroll bar.

5. The display apparatus according to claim 3, further comprising a pair of scroll operation regions set in the display image, wherein
   the pair of scroll operation regions includes the at least one scroll operation region, and
   the pair of scroll operation regions is arranged to be separate in the first direction.

6. The display apparatus according to claim 3, wherein the scroll amount is larger as the operated one subregion is farther from a center in the first direction of the scroll bar.

7. The display apparatus according to claim 3, wherein
   the plurality of destination candidates is classified into a plurality of groups,
   each subregion of the plurality of subregions is associated with one of the plurality of groups,
   the display unit adds second identification labels for identifying the plurality of groups to the plurality of subregions and displays the second identification labels adjacent to the plurality of subregions, and
   in a case where the operation unit receives the operation on the one subregion of the plurality of subregions, the display unit displays, in the destination candidate display section, destination candidates of a respective group of the plurality of groups corresponding to the operated one subregion.

8. The display apparatus according to claim 7, wherein the display unit displays the second identification labels in a case where the operation unit receives the operation for pointing a predetermined region in the display image.

9. The display apparatus according to claim 7, wherein the display unit displays the second identification labels in a case where the operation unit receives the operation for pointing the one subregion of the plurality of subregions.

* * * * *